Figure 6:
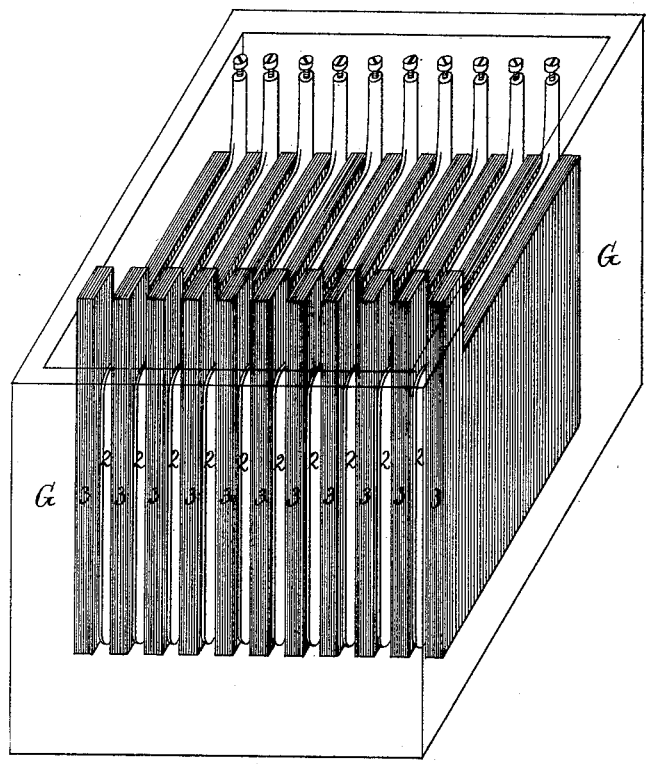

(No Model.) 4 Sheets—Sheet 1.
C. PAYEN.
PROCESS OF PRODUCING CRYSTALLIZED METAL PLATES.
No. 415,347. Patented Nov. 19, 1889.
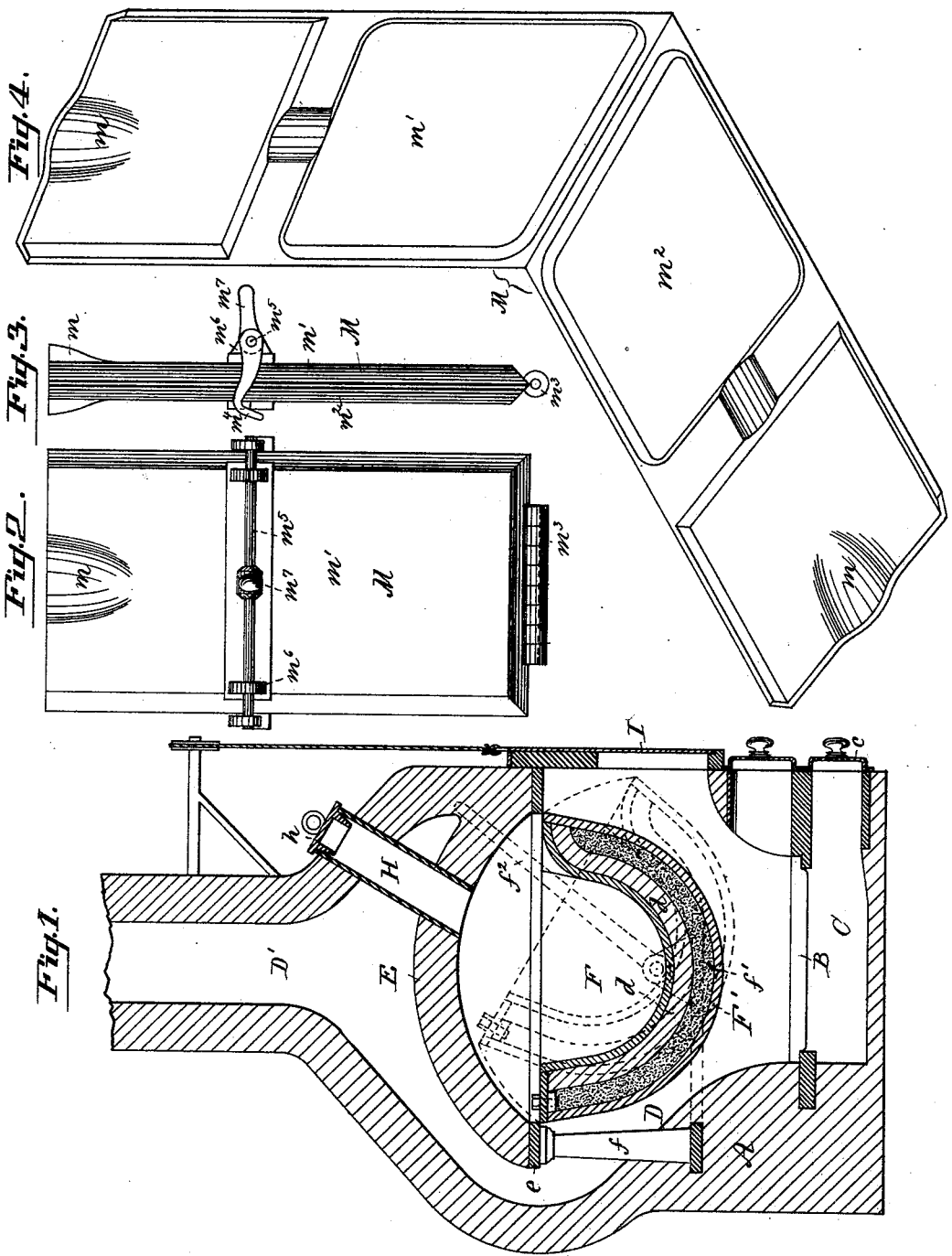
WITNESSES:
Hermann Bormann
Thomas M. Smith.
INVENTOR:
Clement Payen,
By J. Walter Douglass
Atty.

(No Model.) 4 Sheets—Sheet 2.
C. PAYEN.
PROCESS OF PRODUCING CRYSTALLIZED METAL PLATES.
No. 415,347. Patented Nov. 19, 1889.
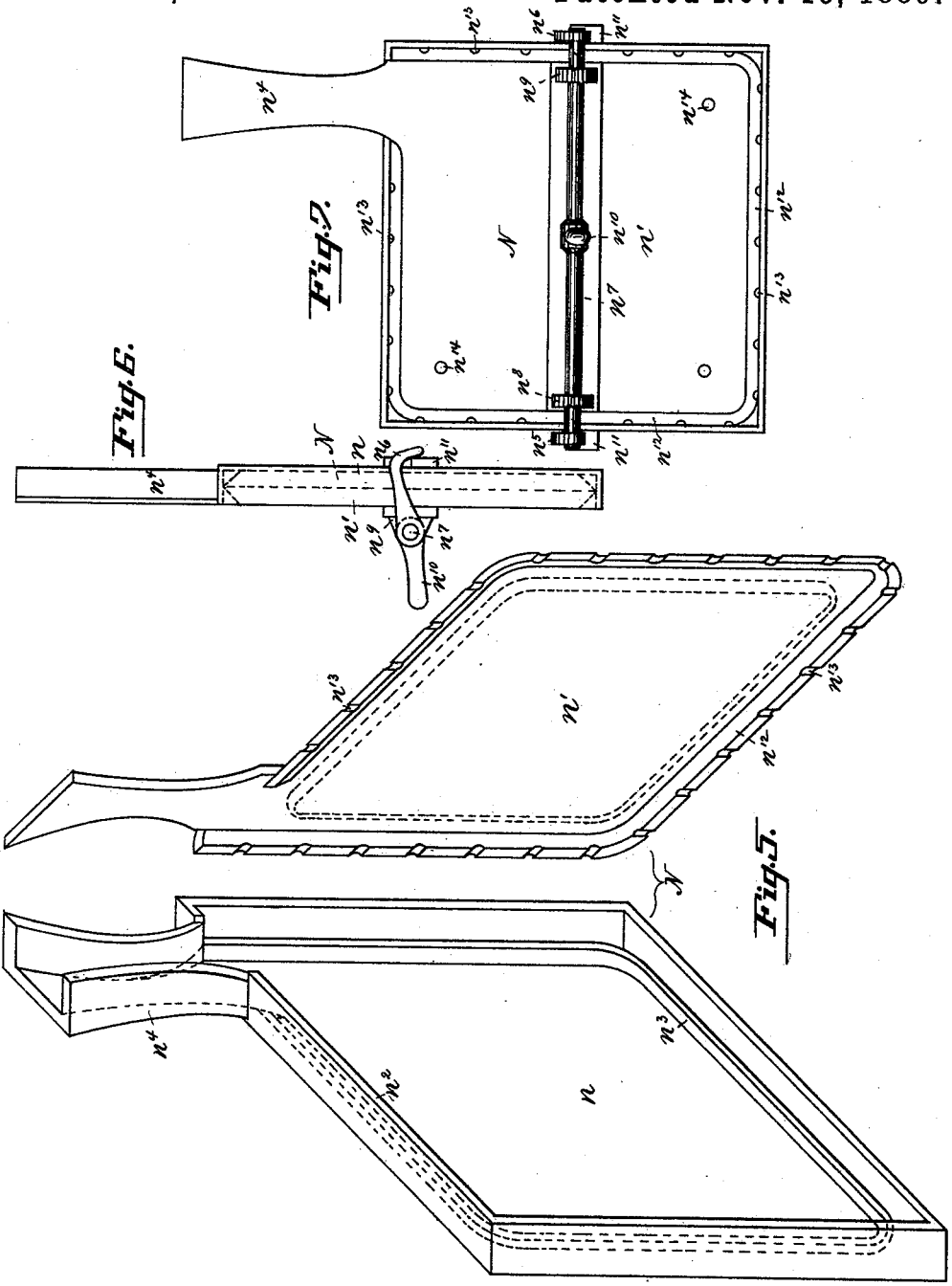
WITNESSES:
Hermann Bormann
Thomas M. Smith
INVENTOR:
Clement Payen
By J. Walter Douglass
Atty (No Model.) 4 Sheets—Sheet 3.

C. PAYEN.
PROCESS OF PRODUCING CRYSTALLIZED METAL PLATES.

No. 415,347. Patented Nov. 19, 1889.

WITNESSES:
Hermann Bormann.
Thomas M. Smith.

INVENTOR:
Clement Payen,
By J. Walter Douglass.
Atty.

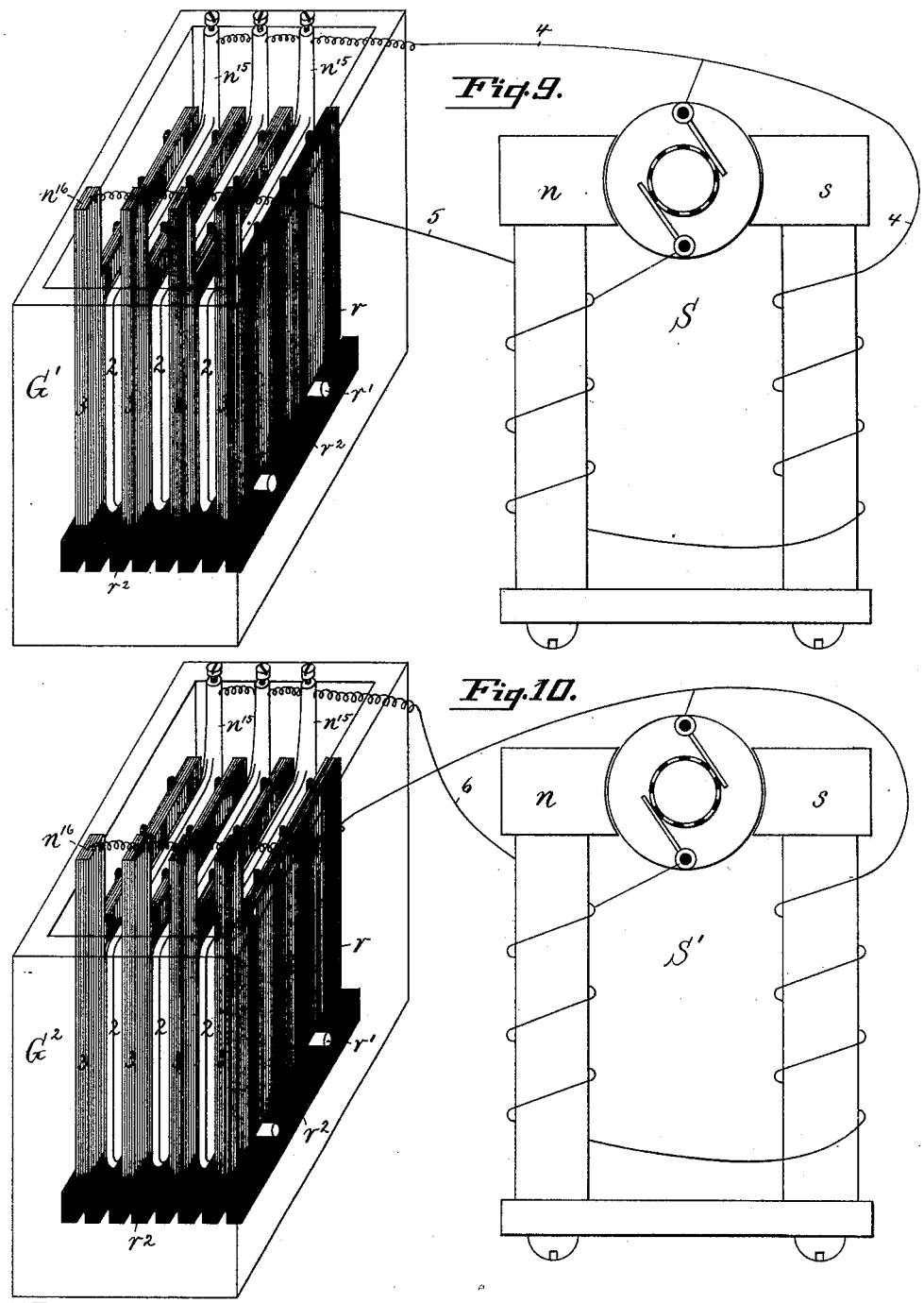

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING CRYSTALLIZED METAL PLATES.

SPECIFICATION forming part of Letters Patent No. 415,347, dated November 19, 1889.

Application filed January 26, 1888. Serial No. 261,953. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented a certain new and Improved Process of Producing Crystallized Metal Plates, of which the following is a specification.

My invention relates to a method for producing a porous crystallized metallic plate of any dimension and form having its crystalline atomic aggregation formed with geometrical regularity in parallel columns.

This invention consists in subjecting the salt of a metal that is required, mixed or combined with a metal or metals or the salt or salts of such metal or metals or combinations in variable proportions thereof, to fusion, then causing the mass or compound to assume a crystalline form, then reducing the crystallized plate thus formed to a metallic state by chemical action, and then washing the same, whereby a chemically-pure porous crystallized metallic plate having great strength will be produced.

An important feature of my invention in the reduction of the crystallized plate to a metallic state is the elimination by my method of treatment of all extraneous matter, which leaves the plate in a chemically-pure porous metallic state and in a condition especially adapted for use as an electrode of a secondary or storage battery.

In the accompanying drawings I have illustrated apparatus for the conduct of the method for the production of such a porous crystallized metal plate, and in which—

Figure 1 is a vertical central section through a melting or fusing furnace of my improved construction, showing the crucible pivotally supported therein and operated by a lever for discharging the contents thereof. Fig. 2 is a top or plan view of my improved mold made in two sections and hinged to each other, and showing also the means for clamping the same together. Fig. 3 is an end view of said mold. Fig. 4 is a perspective view of said mold made in two sections and hinged to each other, and showing also the interior formation of the same. Fig. 5 is a perspective view of the bivalved mold for framing the crystallized metallic plate. Fig. 6 is an end view of said framing-mold clamped together. Fig. 7 is a top or plan view of said framing-mold, and showing also the clamping device thereof. Fig. 8 is a perspective view of a canister with a system of crystallized chloride plates in contact with a system of metallic zinc plates of the same dimension, and these plates immersed in a solution of water, and preferably sal-ammoniac for reducing said crystallized chloride plates to a metallic state or condition by chemical action. Figs. 9 and 10 are diagrammatic views showing, respectively, canisters containing water and sulphuric acid, with a system of crystallized plates and a system of ordinary lead or charcoal plates therein insulated from each other and from the canisters, and the respective plates connected through their supports or tongues and wires with dynamos, and which views illustrate the first and second electrolysis to which said crystallized plates may be subjected in order to reduce said crystallized plates to a perfect metallic state or condition if all the chlorides have not been thoroughly eliminated by the solution step of the process—for instance, as illustrated in Fig. 8.

Referring to the accompanying drawings, A is the furnace, constructed of brick or other suitable material and of any suitable form.

B is a grate located and supported in the lower part of the furnace. Beneath the grate B is an ash-pit C, closed from the outside of the furnace by means of a door *c*.

D is a draft-flue leading to the chimney D'.

E is an arch made of brick or other refractory material in the upper part of the furnace and supported in position by means of a metallic plate *e*, with a central opening therein. The annular plate *e* is held in position by means of columns *f*, arranged and supported in the brick-work of the furnace in any suitable manner.

F is a porcelain crucible or melting-pot open at the top, and around the outer circumference thereof is formed a layer $d$ of amianthus, asbestos, or other suitable material, and between the layer $d$ and the metallic pot F' is a film or layer of sand $f''$, of any desired thickness.

The metallic pot F' is pivotally supported in a central position within the furnace, and is operated from the outside by a lever $f^2$, attached to one of the journals of the metallic pot F', whereby the crucible F may be readily tilted for discharging the contents thereof into a receptacle for further treatment.

H is an inclined metallic hopper provided with a removable stopper $h$, by which arrangement the material may be readily charged into the crucible F.

I is a sliding door operated in any suitable manner to allow of the discharge of the molten mass or compound into a suitable mold for causing crystallization to take place.

Having described and pointed out the characteristic features of the melting or fusing furnace, I will now proceed to describe the first step in the process of producing a crystallized metallic plate of a given size—say from six to twelve inches square.

I take for the base a charge of chloride of lead, ($PbCl_2$,) and to which I add two per cent., by weight, (more or less,) of chloride of cadmium and two per cent., by weight, (more or less,) of chloride of zinc or of metallic zinc, and these chlorides—namely, the chloride of cadmium and chloride of zinc or metallic zinc—may be added either before or during the fusing of the mass or compound in any suitable manner; but I prefer to add the chloride of cadmium or chloride of zinc, or both chlorides, gradually during the fusion of the chloride of lead in the crucible F. The proportion of chloride of cadmium and of chloride of zinc or of metallic zinc to the charge of chloride of lead will in each case depend upon the degree of porosity desired in the finished plate. It will therefore be seen that by simply varying the proportions of the chlorides or of the metallic zinc mixed or combined with the charge of chloride of lead the degree of porosity required may be readily and economically obtained. I have found by practical experience that when the aforesaid chloride of cadmium and chloride of zinc or metallic zinc are added to the charge of chloride of lead the plates thereby framed after fusion and crystallization possess great strength, and that the fractures thereof offer a clean, bright, and uniform surface, or, in other words, the plate is much stronger than it would be if the chloride of cadmium had not formed an element of the compound for treatment in the production of such plate. I have, however, obtained also good results by the substitution of ammonium salts for the chloride of zinc, and in the use of ammonium salts combined with the chloride of lead I have produced a porous crystallized plate chemically pure having substantial consistency or strength.

The simple addition of chloride of cadmium to the charge of chloride of lead enables me to obtain a crystallized plate which is not hygroscopic, and this is a very necessary condition, especially when it is desired to form a frame around the plate for using such plates for electrical accumulators or storage-battery systems. I have found that when either metallic zinc or chloride of zinc alone has been added to the charge of chloride of lead the plate, after crystallization has taken place, will be more or less hygroscopic, yet not to an extent to impair the ultimate utility of the plate after reduction to a metallic state, especially if no great degree of porosity is desired, while on the other hand, if the chloride of cadmium, which of itself is not of a deliquescent nature, be added to the mass or compound excellent results are obtained.

While I have hereinabove mentioned a certain specific salt of a metal as forming the base of a charge for illustrating my process for the production of a crystallized metallic plate with the desired degree of porosity, yet I do not wish to be understood as limiting myself to using the salt of such particular metal having the chlorides of other metals or a metal or other metals combined therewith for obtaining as a product such particular metal, because my method covers generally and broadly the treatment of any salt of the metal required by using a salt of that metal alone or combined with other salts of that metal, or of a metal or metals or a salt or salts of such metal or metals, and reducing the plate so formed after crystallization to a metallic state by chemical action.

When the chloride of lead in excess having a varying quantity or percentage of a salt or salts of other metals or of a metal combined therewith have been subjected to fusion in the crucible F and the mass has reached a liquid or molten state, the crucible is tilted by means of the lever $f^2$ and the sliding door I at the same time raised sufficiently to permit of the discharge of the contents into a mold M through the mouth $m$ thereof, and in a few minutes thereafter solidification will take place in the cooling off of the same therein, and the plate cast or formed will become crystallized. In some instances it may be well to heat the mold M previous to charging the molten mass or compound into the same to a temperature of 150° centigrade, (more or less,) and still obtain good results in the crystallization of the mass or compound.

The selection of proper material for the mold M is of some considerable importance, and the interior surface thereof should be perfectly smooth.

The mold to which I give preference is one made of either brass or bronze composed of two symmetrical sections $m'$ and $m^2$, chamfered, as shown in Fig. 4, and the two sections united to each other by means of hinges $m^3$ and held together by means of catches $m^4$, secured to the extremities of the shaft $m^5$, held in bearings $m^6$, formed with one of the sections and operated by a lever $m^7$, as shown in Figs. 2 and 3. The two sections constituting the crystallizing-mold M may be formed so that each will be of a uniform thickness of metal and the thickness of each section varying from two to five millimeters, according to the dimensions of the crystallized metallic plate to be obtained. This similarity and uniform thickness of each section is for some purposes advantageous, for the reason that crystallization therein commences from each side of the mold.

When a fused mass is poured into a two-part mold of equal thicknesses of metal, the mass will commence to cool from each side, and the crystals composing the same will meet or unite with each other at their summits, sides, or facets, forming columns throughout the mass, and the columns of crystals thus formed from the respective sides of the mold meet or unite at the median line of the plate or other structure. On the other hand, if the parts of the mold are of unequal thicknesses of metal, the crystals of the mass will commence to cool therein from the side having the greater thickness of metal, and will meet the mass forming in columns from the opposite side of the mold beyond the median line of the plate or other structure.

In the formation of plates from a fluid mass in molds having the sides of equal thicknesses of metal such plates when reduced to a metallic state will be brought to a state or condition with a maximum degree of porosity and strength, thereby rendering them especially applicable for use as electrodes of secondary or other batteries.

When the chloride plate crystallized has become solid in the mold M, the two symmetrical sections $m'$ and $m^2$ thereof are unclamped and the plate removed into another mold N for casting around said crystallized plate a frame of lead or other suitable material. This bivalved framing-mold N consists of two sections $n$ and $n'$, made of cast iron or other suitable material. The section $n$ of the framing-mold N has an upper flange $n^2$ around the sides when in the form of a rectangular parallelopipedon and with a beveled rim $n^3$ on the four interior sides of the bottom. With the section $n$ is formed a funnel-shaped trough or neck $n^4$ for the introduction of material into the mold when the two sections $n$ and $n'$ are clamped together by means of the catches $n^5$ and $n^6$, rigidly secured to each end of the shaft $n^7$ and journaled in bearings $n^8$ and $n^9$, secured to the exterior surface of the section $n'$ and operated by a lever $n^{10}$, which causes the catches $n^5$ and $n^6$ to engage with the strengthening-strip $n^{11}$, secured to the exterior surface of the section $n$. The section $n'$ has an interior beveled rim $n^{12}$, corresponding with the beveled rim $n^3$ of the section $n$. The four sides or edges of the section are slightly deflected downward and a series of niches or grooves $n^{13}$ are formed in the under edges, constituting air or vent holes when the two sections are clamped together. In the section $n'$, as shown in Fig. 7, two or more openings $n^{14}$ are formed at suitable distances apart for the introduction of small pins for holding the crystallized plates in proper position in the mold to allow lead or other suitable material to become cast uniformly around the plate in the form, preferably, of a beveled frame with a tongue or support $n^{15}$.

The chloride plates crystallized and framed in the manner hereinabove described, after having cooled off completely, are then in condition for further treatment or reduction to a metallic state in the following manner: In a canister G, containing a solution of any chloride and water, preferably sal-ammoniac, in the proportion of five to ten per cent., (more or less,) a series of the crystallized chloride plates are now arranged alternately in contact with a series of metallic zinc plates or with any other suitable metallic plates. It is important in each instance to select metallic plates for contact with crystallized plates which shall have a greater affinity for the foreign elements or extraneous matter contained in the crystallized plates than the crystallized plates have for such foreign elements. Then, furthermore, after having selected the proper metallic plate for contact with the crystallized plate and the two series of plates have been immersed in the canister G, it is important that the solution should be composed of a salt which belongs to the same family or class as the salt of which the crystallized plates are mainly composed, because much better results are obtainable.

If a series of crystallized chloride-of-lead plates 2, treated substantially in the manner hereinbefore described, be immersed in a solution of sal-ammoniac and water in the canister G in contact with metallic zinc plates 3 for from twelve to fifteen hours, (more or less,) the effect produced by such chemical action upon the crystallized chloride plates will be to eliminate the chlorine contained in said crystallized plates of lead and to drive the same upon the metallic zinc plates, so that by the chemical action which takes place all the chlorine in the chloride of lead in the several crystallized plates will be readily and economically eliminated, while the chloride of zinc and chloride of cadmium will be dissolved by the solution—that is to say, separated from the crystallized plates—and the sal-ammoniac solution will then contain also chloride of zinc and chloride of cadmium, and such chlorides having been eliminated from the crystallized plates they are then removed from the canister G and thoroughly washed, and thereby brought to a pure metallic condition with the desired degree of porosity and with the requisite amount of strength for use for electrical accumulators or storage-battery systems and other purposes.

If after thoroughly washing the crystallized metallic lead plates they should still contain foreign matters or elements—such as chlorides of the metals—by subjecting the same to a double electrolysis in the manner to be hereinafter described every possible trace of chloride or chlorides of the metals may be eliminated, and the crystallized plates after such treatment will be found to be chemically pure; but such treatment I have not found to be necessary in practice for manufacturing crystallized metallic lead plates in accordance with my invention, as hereinbefore described; but if in the more extended practice of my invention in the treatment of other metals such further treatment should be found necessary it may be conducted or carried out in the following manner: The crystallized chloride plates 2, Fig. 9, may be now mounted in a glass receptacle $G'$, containing a solution of sulphuric acid and water in the proportion of about ten per cent., (more or less,) and these plates alternated with other plates of equal dimension of ordinary lead or charcoal 3, each having a tongue $n^{16}$, all the crystallized plates 2 being connected through their respective tongues or supports $n^{15}$ with the wire 4, while all the lead or charcoal plates 3 are connected through their respective tongues with the wire 5, and the two systems of plates insulated from each other by means of the insulating-rods $r$, of rubber or other suitable material, are insulated from the canister $G'$ by means of the glass insulators $r'$, mounted on the horizontal insulating-bars $r^2$ in the bottom of the canister $G'$, as clearly shown in Fig. 9, the system of crystallized plates being connected through their tongues or supports $n^{15}$ and the wire 4 with the negative electrode $s$ of the dynamo S, while the system of lead or charcoal plates are connected through their tongues or supports $n^{16}$ and the wire 5 with the positive electrode of the dynamo S, and in consequence of the electrolysis which takes place the oxygen is disengaged from the water and the chlorine is eliminated from the crystallized plates, while on the system of crystallized plates there remain lead, zinc, and cadmium, all metallic, if they were the chlorides of the metals used in the process of crystallization. The crystallized plates subjected to the above-described electrolysis may then be removed from the glass canister $G'$ into another glass canister $G^2$, containing a solution composed of water and sulphuric acid in about the same proportions as hereinabove mentioned. In this second glass canister $G^2$ the crystallized plates are again alternated with others of ordinary lead or artificial charcoal, as in the previous instance, and the two systems of plates, insulated, respectively, from each other and insulated from the glass canister $G^2$, are again connected through their respective supports or tongues and the wires 6 and 7 with the dynamo $S'$, as in the first instance described, with this exception, that the negative electrode $s$ is connected with the system of lead or charcoal plates, while the positive electrode is connected with the system of crystallized plates, as shown in Fig. 10. By this second electrolysis which takes place the cadmium and zinc metallic will be eliminated from the crystallized plates, thereby leaving them in a porous crystallized metallic state. The second electrolysis having been completed, the crystallized metallic plates may then be removed from the glass canister or receptacle $G^2$ and thoroughly washed, and then dried in any suitable manner for use.

Having thus described the nature and objects of my invention, what I claim as new, and desire to secure by Letters Patent, is—

1. The process of producing a porous crystallized metal structure, which consists in subjecting metallic salts and a metal to fusion, then pouring the fused mass into a mold and allowing it to crystallize therein, and then reducing by chemical action the structure to a metallic state, substantially as and for the purposes set forth.

2. The process of producing a porous crystallized metal structure, which consists in subjecting metallic salts to fusion, then pouring the fused mass into a mold and allowing it to cool and crystallize therein, then reducing by chemical action the structure to a metallic state, and then to electrolytic action to cause impurities to be removed therefrom.

In witness whereof I have hereunto set my hand in the presence of two subscribing witnesses.

CLÉMENT PAYEN.

Witnesses:
CHAS. HART,
J. WALTER DOUGLASS.